(12) United States Patent
Alapuranen et al.

(10) Patent No.: US 7,920,586 B2
(45) Date of Patent: Apr. 5, 2011

(54) SYSTEM AND METHOD FOR SELECTING A MEDIUM ACCESS TECHNIQUE FOR TRANSMITTING PACKETS OVER A NETWORK

(75) Inventors: Pertti O. Alapuranen, Deltona, FL (US); Avinash Joshi, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 1045 days.

(21) Appl. No.: 11/238,572

(22) Filed: Sep. 29, 2005

(65) Prior Publication Data

US 2007/0070896 A1    Mar. 29, 2007

(51) Int. Cl.
*H04B 7/212* (2006.01)
*H04L 12/413* (2006.01)

(52) U.S. Cl. .................................... 370/442; 370/445

(58) Field of Classification Search .................. 370/329, 370/347, 348, 352, 442, 443, 445, 447
See application file for complete search history.

(56) References Cited

U.S. PATENT DOCUMENTS

| | | | |
|---|---|---|---|
| 5,742,599 A * | 4/1998 | Lin et al. | 370/395.65 |
| 6,105,079 A * | 8/2000 | Kuo et al. | 710/25 |
| 6,498,790 B1 * | 12/2002 | Shaheen et al. | 370/347 |
| 6,807,165 B2 | 10/2004 | Belcea | |
| 6,873,839 B2 | 3/2005 | Stanforth | |
| 7,072,650 B2 | 7/2006 | Stanforth | |
| 2003/0142692 A1 * | 7/2003 | Shimada | 370/442 |
| 2003/0161288 A1 * | 8/2003 | Unruh | 370/338 |
| 2004/0136396 A1 * | 7/2004 | Yonge et al. | 370/445 |
| 2006/0153232 A1 * | 7/2006 | Shvodian | 370/468 |
| 2007/0214504 A1 * | 9/2007 | Comparetti et al. | 726/23 |

OTHER PUBLICATIONS

Request for Comments (RFC) 791, "Internet Protocol," Sep. 1981, 51 pages.
Nichols, K. et al., Request for Comments (RFC) 2474. "Definition of the Differentiated Services Field (DS Field) in the IPv4 and IPv6 Headers," Dec. 1998, 20 pages.
Blake, S. et al., Request for Comments (RFC) 2475, An Architecture for Differentiated Services, Dec. 1998, 36 pages.

* cited by examiner

*Primary Examiner* — Chirag G Shah
*Assistant Examiner* — Yong Zhou
(74) *Attorney, Agent, or Firm* — Randi L. Karpinia

(57) ABSTRACT

A system and method for transmitting packets in a network (100). A node (102, 106, 107) in the network (100) accesses uses one of a plurality of medium access techniques for transmitting packets on the network (100). The node (102, 106, 107) separates packets to be transmitted into classes based on at least one characteristic of the packets and selects one of the medium access techniques for each class of packets based on whether the medium access technique provides improved transmission efficiency for the at least one characteristic of the packets in the class. The node (102, 106, 107) transmits the packets in each respective class using the respective selected medium access technique.

10 Claims, 5 Drawing Sheets

SYSTEM AND METHOD FOR SELECTING A MEDIUM ACCESS TECHNIQUE FOR TRANSMITTING PACKETS OVER A NETWORK

FIELD OF THE INVENTION

The present invention relates in general to wireless communication networks, and in particular to a system and method for selecting an appropriate media access technique for transmitting packets over a network, such as a wireless ad-hoc multihopping communication network.

BACKGROUND

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CSMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. patent application Ser. No. 7,072,650 entitled "Ad Hoc Peer-to-Peer Mobile Radio Access System Interfaced to the PSTN and Cellular Networks," granted on Jul. 4, 2006, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel," filed on Mar. 22, 2001, now U.S. Pat. No. 6,807,165 and in U.S. patent application Ser. No. 09/815,164 entitled "Prioritized-Routing for an Ad-Hoc, Peer-to-Peer, Mobile Radio Access System," filed on Mar. 22, 2001, now U.S. Pat. No. 6,873,839, the entire content of each being incorporated herein by reference.

In these types of networks, nodes transmit information in the form of packetized signals using a protocol such as Internet Protocol (IP) or any other suitable protocol as can be appreciated by one skilled in the art.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
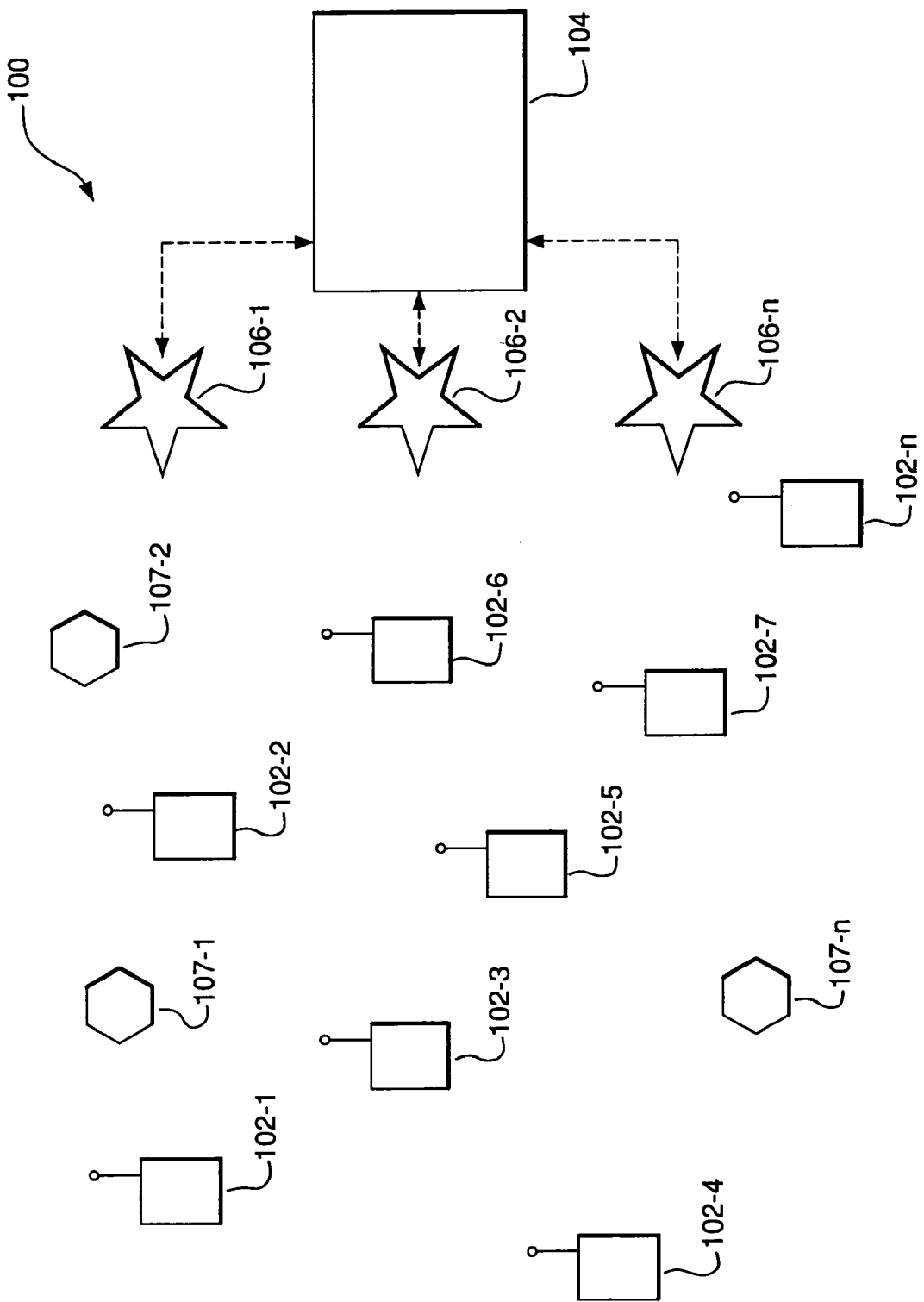
FIG. 1 is a block diagram of an example of an ad-hoc multihopping wireless communications network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for selecting an appropriate media access technique for transmitting packets over a network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for selecting an appropriate media access technique for transmitting packets over a network described herein. The non-processor circuits may include, but are not limited to, a radio receiver, a radio transmitter, signal drivers, clock circuits, power source circuits, and user input devices. As such, these functions may be interpreted as steps of a method for selecting an appropriate media access technique for transmitting packets over a network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the present invention provides a system and method for transmitting packets on a network. The system and method according to an embodiment of the present invention described herein selects an appropriate medium access technique from among multiple medium access techniques for transmitting packets on the network. The system and method separates packets to be transmitted into classes based on at least one characteristic of the packets, and selects one of the medium access techniques for each class of packets based on whether the medium access technique provides optimum transmission efficiency for the at least one characteristic of the packets in the class. The system and method thus transmits the packets in each respective class using the respective selected medium access technique.

FIG. 1 is a block diagram illustrating an example of an ad-hoc packet-switched multihopping wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650, 6,807,165 and 6,873,839, referenced above.

Figure 2:
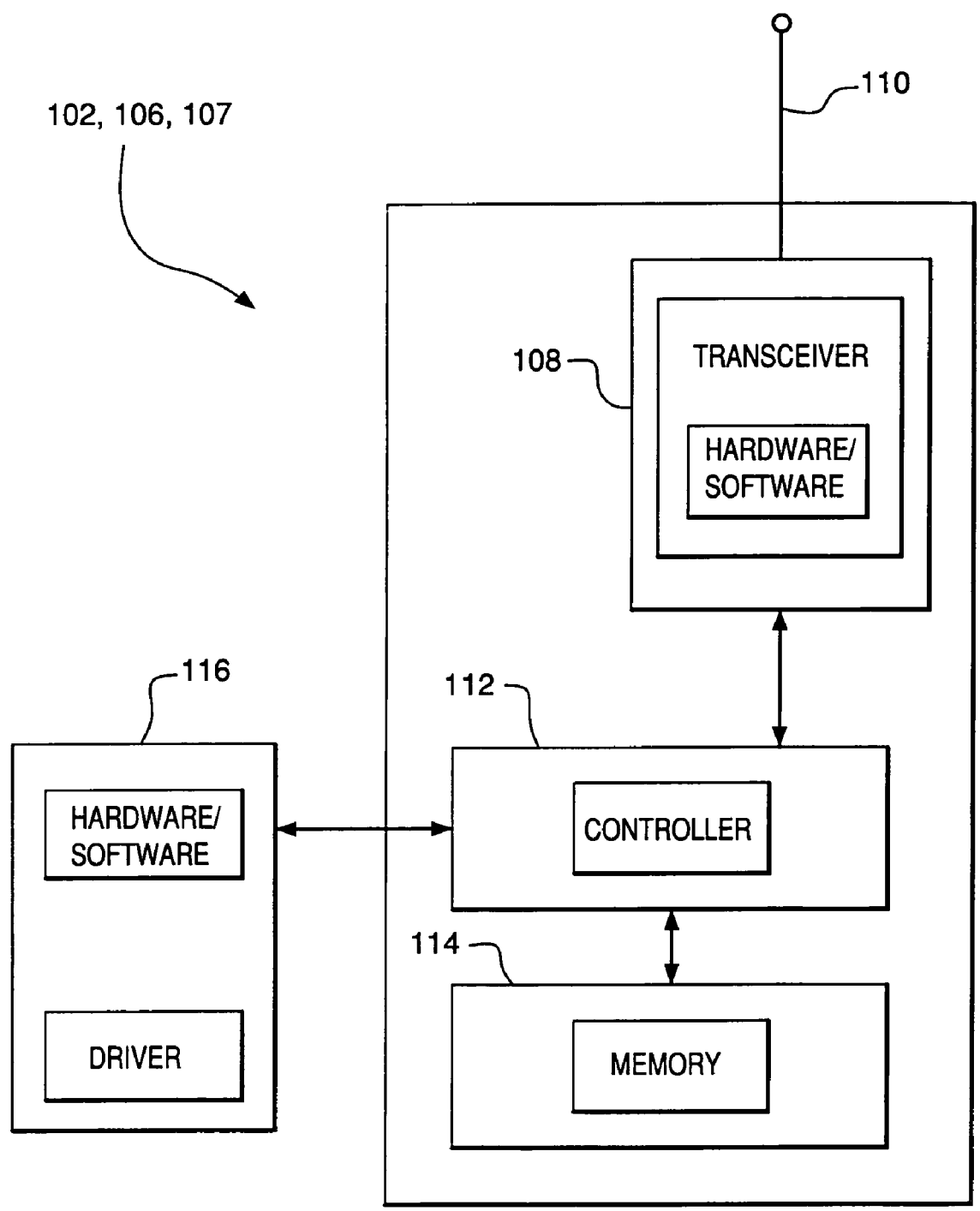
FIG. 2 is a block diagram illustrating an example of a node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

The embodiment of the present invention that will now be described improves system performance of a wireless network, such as the ad-hoc multihopping network 100 described above, by enabling a transmitting node to automatically select a Medium Access Protocol from among multiple medium access techniques based on the characteristics of traffic observed by the node and the characteristics of packets to be transmitted, such as packets generated by an application running on host 116. By selecting a Medium Access Protocol that is suitable for the characteristics of the packets to be transmitted, the transmission performance through the network is improved by, for example, providing for higher throughput, lower delay, lower jitter and/or appropriate Quality of Service (QoS).

In accordance with the embodiment of the present invention described herein, multiple access techniques are available for use by a transmitting node, which can be any of the nodes 102, 106 or 107 shown in FIG. 1. The node is configured to use the results of data analysis in order to select one of the medium access techniques for transmission of a certain type of packet to select a particular medium access control (MAC) protocol to transmit packets generated by a particular application, or having certain characteristics that make use of the particular MAC protocol that is beneficial for transmission of the packets. As will be appreciated by those of ordinary skill in the art, different multiple access methods have different properties. For example, time division multiple access (TDMA) can be very efficient as a multiple access technique for situations where access is only required for small amounts of traffic, that is, when multiple access is needed only for initial bandwidth reservation on another channel, or for guaranteed QoS. However, as can be appreciated by one skilled in the art, TDMA generally becomes less efficient when one node has a large amount of data to transmit while other nodes are idle. Carrier sense multiple access/collision avoidance (CSMA/CA) is an efficient technique for bursty traffic, but the efficiency of CSMA/CA deteriorates as traffic approaches the capacity of the channel. CSMA/CA also can suffer from the hidden node problem as can be appreciated by one skilled in the art. That is, the presence of hidden nodes can cause collisions to increase, and the efficiency of the CSMA/CA algorithm can decrease to that of the "ALOHA" method, which thus degrades the quality of service available on the channel. As can be appreciated by one skilled in the art, the "ALOHA" method is a simple communications scheme in which each source (transmitter) in a network sends data whenever there is a frame to send. If the frame successfully reaches the destination (receiver), the next frame is sent. If the frame fails to be received at the destination, it is sent again. Also, CSMA/CA can provide a relatively low level QoS because there is generally no guarantee that a packet will be sent within a prescribed time limit.

As can further be appreciated by one skilled in the art, in fourth generation (4G) systems (e.g., fourth generation wireless wide area network communications systems that are characterized by high-speed data rates such as those greater than twenty (20) megabits per second (Mbps), that are suitable for high-resolution movies and television), the higher protocol layers can be based on the Internet Protocol (IP) and the lower layers may not be aware of the actual properties of the application, since this information is typically not included in data frames or packets. The application information can be delivered using some type of protocol or out of band signaling. That is, the IP protocol can contain information about Quality of Service (QoS) using, for example, differentiated services code point (DSCP) values, service bits in an IP header, such as the Type of Service field in IP as described in Request for Comments (RFC) 791 (Internet Protocol, September 1981), or some of the mechanisms included in IP Version 4 (IPv4) and IP Version 6 (IPv6) headers as described in RFCs 2474 and 2475. However, this information typically does not include all the information that is relevant to the handling of a frame in a wireless multi-hop environment, for example.

In accordance with the embodiment of the present invention described herein, a wireless network can support more than one MAC protocol. For example, the nodes 102, 106 or 107 of the network 100 shown in FIG. 1 can transmit a super frame in which some slots are regular TDMA slots while the rest of the frame can be contention slots, as in CSMA/CA. In another example, the nodes 102, 106 or 107 of the network 100 may include a dedicated reservation time slot for a transmission node to reserve timeslots or other resources in the network 100, where the reservation time slot includes capacity that is unused for reservation and may be employed to send small sized packets.

Figure 3:
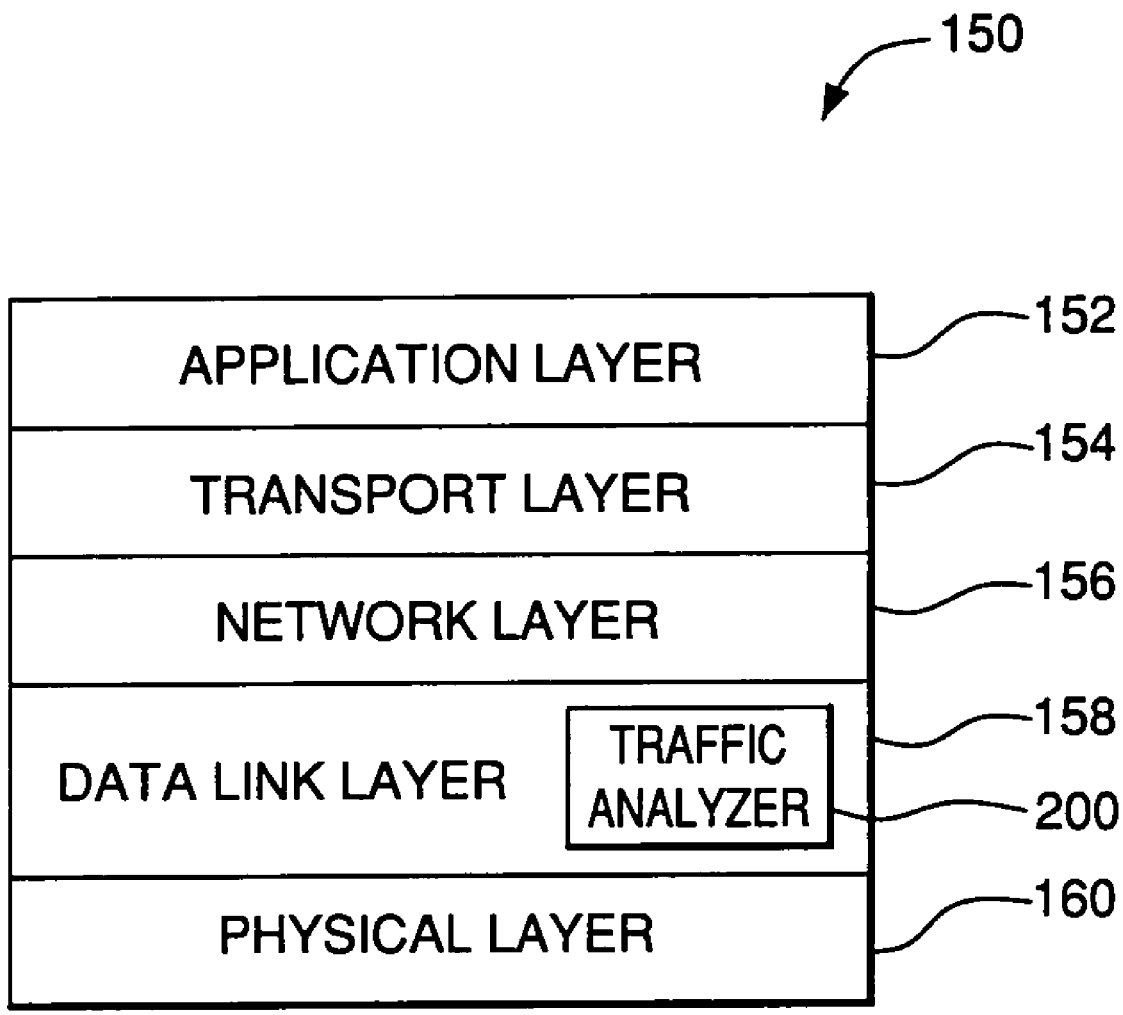
FIG. 3 is a protocol stack diagram illustrating a traffic analyzer in a data (logical) link layer.

In accordance with the embodiment of the present invention described herein, a traffic analyzer software module is used to select a medium access technique for packets to be transmitted via the transceiver 108. FIG. 3 shows a protocol stack 150 that comprises a Traffic Analyzer Module 200 embedded in the data (logical) link layer 158. The Traffic Analyzer Module 200 operates in the Data Link Layer 158 which is below Network Layer 156, and interacts with different MAC protocols that also reside in the data link layer 158. The Traffic Analyzer Module 200 also may also interact with upper layers, for example, a routing function in the transport layer 154, to specify the bandwidth and timing requirements. As can be appreciated by one skilled in the art, the controller 112 of the nodes 102, 106 and 107 and associated hardware and software can perform the operations relating to the protocol stack 150 as described herein.

The Traffic Analyzer Module 200 captures the packets that are scheduled for transmission by the transceiver 108, which is part of the physical layer 160. These packets include the packets that were generated by the host 116 of the node 102, 106 or 107 or were received from some other node 102, 106 or 107. The Traffic Analyzer Module 200 then separate the packets based on their QoS requirements, packet sizes, inter-arrival time and/or similar features as pre-programmed into the Traffic Analyzer Module 200. The separation can be done, for example, by sending the packets to different sub-queues or by attaching appropriate tags to the packets. The Traffic Analyzer Module 200 then analyzes the traffic and creates, for example, histograms and other statistics of the traffic.

Based on these statistics, as well as the condition of the channel and neighborhood in which the node 102, 106 or 107 is present (e.g., the extent to which hidden node problems exist), the Traffic Analyzer Module 200 chooses the appropriate MAC protocol for a particular group of packets. The Traffic Analyzer Module 200 also informs a routing module (or some other appropriate module) to request/reserve appropriate bandwidth/time-slots. For example, if the host 116 has some active voice calls occurring, the host 116 will be made aware of the number of time slots required to support the voice calls by the histogram produced by the Traffic Analyzer Module 200. If the node 102, 106 or 107 cannot gain access to additional time slots due to, for example, scheduling issues, and the controller 112 of the node 102, 106 or 107 can be reasonably sure that proper QoS can be guaranteed through the use of CSMA, the controller 112 of the node 102, 106 or 107 may direct the transceiver 108 to transmit voice calls packets using the CSMA MAC protocol.

Figure 4:
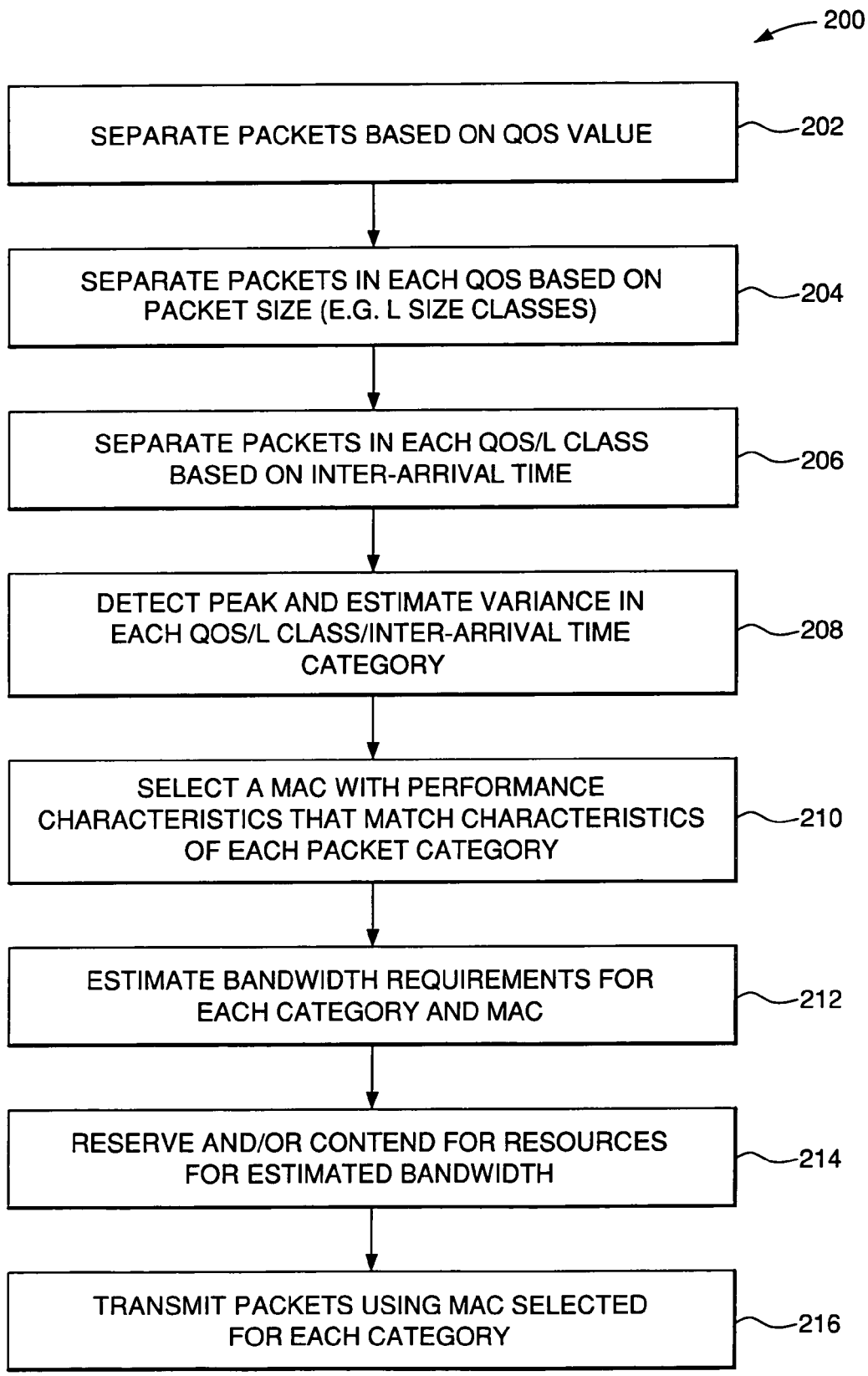
FIG. 4 is a control flow diagram illustrating an example of a process by which packets are assigned to be transmitted by a MAC protocol based on one or more characteristics of the packets according to an embodiment of the present invention.

FIG. 4 is a control flow diagram illustrating one example of a process performed by Traffic Analyzer Module 200 for categorizing transmission packets based on their characteristics and selecting a MAC based on those characteristics according to an embodiment of the present invention. In step 202, the Traffic Analyzer Module 200 separates the packets to be transmitted based on, for example, a quality of service (QoS) value. The packets may be placed into different sub-queues when separated or marked with a tag to differentiate them. In this example, the Traffic Analyzer Module 200 classifies frames into different classes based on QoS and assigns each class to a sub-queue for transmission. In step 204, the packets in each QoS are further separated based on packet size into different size classes. For example, there may be L different size classes resulting in L sub-queues for each QoS sub-queue. In this example, a histogram of length is computed. From this histogram, L classes of different length packets are determined. The value for L, in this example, is three (3); however, the value for L can be any other suitable value, but generally can be ten (10) or less. The reason for separating packets based on length is that different protocols produce different length packets. For example, Voice over Internet Protocol (VoIP) typically produces frequent short packets, Video applications typically produce frequent long packets, and File Transfer Protocol (FTP) produces long packets. In this example, there are three different classes for L as follows: under one-hundred (100) bytes; one-hundred (100) to eight-hundred (800) bytes; and over eight-hundred (800) bytes.

In step 206, the packets for each QoS/L class, for example, each of the L sub-queues under each of the QoS sub-queues, are further separated based on the inter-arrival time of the packets, that is, the time between packets. As noted above, VoIP, for example, will generally have a large number of small packets arriving in bursts followed by relatively long periods of inactivity. Video packets will typically have long packets that arrive at regular intervals. File Transfer Protocol (FTP) packets typically will be long and arrive in bursts. In step 208, the packets in each of the inter-arrival sub-queues, for example, those packets in each inter-arrival sub-queue for each L class sub-queue for each QoS sub-queue or QoS/L class/inter-arrival time sub-queue, are analyzed (e.g. histogrammed), to detect the peak in the QoS/L class/inter-arrival time sub-queue and estimate the variance within the sub-queue. An inter-arrival time data set is created for all of the combinations of QoS and L length classes. This produces a number of data sets equal to a number of QoS values multiplied by L.

At this point, sufficient statistics have been developed to permit a media access method to be selected that matches at least some of the characteristics of the packets in the QoS/L class/inter-arrival time sub-queue. In step 210, the Traffic Analyzer Module 200 selects a MAC with performance characteristics that match characteristics of the packets in each packet category, for example, QoS/L class/inter-arrival time sub-queue. A MAC protocol is selected and assigned to the sub-queue for transmission. For example, a CSMA MAC may be selected for VoIP packets because of the short packet size, bursty nature, widely varying arrival time, and low quality of service requirements because of the non-deterministic character of CSMA. By contrast, a TDMA MAC may be selected for Video packets because of their high QoS requirements and long length because the TDMA MAC will obtain a dedicated timeslot for the connection.

From the main peak and variance information calculated in step 208, a bandwidth estimate may be computed 212 (e.g., the number of bytes that have to be delivered and at what rate), from the length of the packet class and the approximate packet inter-arrival time. This information is also provided to the intelligent MAC layer and, in addition to be used to determine the appropriate MAC protocol to use, is used to reserve/contend bandwidth 214 accordingly. For example, this information can be used by a centralized scheduler to reserve and plan a number of TDMA timeslots in order to accommodate a stream of video packets. Subsequently, the packets in each packet category, for example, QoS/L class/inter-arrival time sub-queue, are transmitted using the MAC selected for each category 216.

Figure 5:
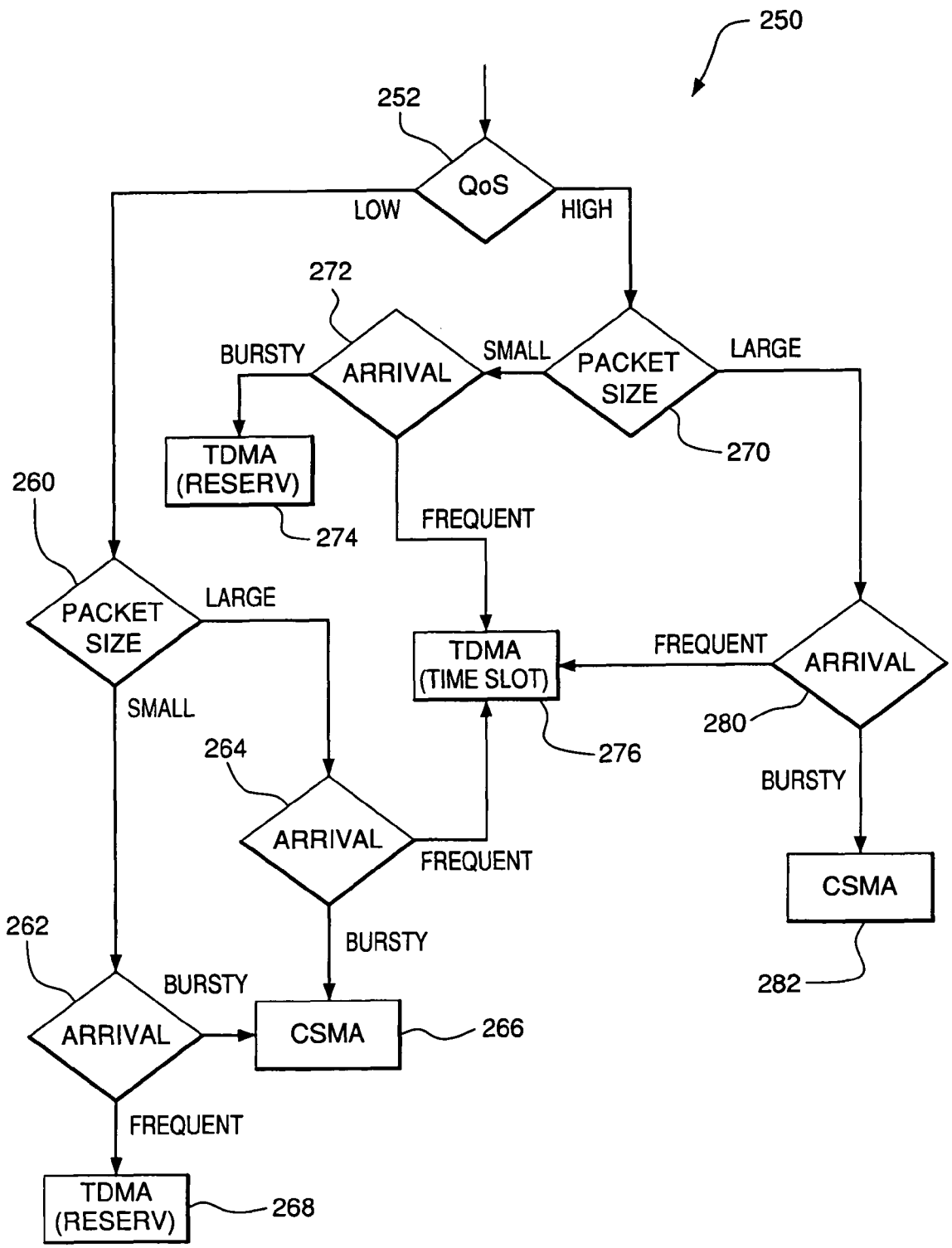
FIG. 5 is a control flow diagram illustrating an example of the selection step of FIG. 4 according to the embodiment of the present invention.

FIG. 5 is a control flow diagram illustrating an example embodiment of the selection step 210 of the process shown in FIG. 4. In this example, in step 252, each packet is separated based on whether it has a high or low value for QoS (e.g., a low value is a QoS value below a certain level, as opposed to a high QoS value which is at or above the certain level). As noted above, this separation can be based on certain values of type of service (ToS) or differentiated service code point (DSCP) in the IP protocol. If the packet has a low QoS value, processing proceeds to step 260, where the packet is differentiated based on packet size. For a small packet size, e.g., less than a certain size, such as one-hundred (100) bytes, processing proceeds to step 262 and for a large packet size, e.g., at or greater than a certain size, such as one-hundred (100) bytes or larger, processing proceeds to step 264.

In step 262, the inter-arrival time of the small packets with low QoS are analyzed. If the packets arrive at frequent intervals, then, in this example, they are assigned in step 268 to a MAC protocol that utilizes a TDMA channel normally used for reserving time slots, but which has additional capacity. If the packets arrive in large numbers at indeterminate intervals, then the traffic is bursty and, in this example, the packets are assigned in step 266 to a CSMA based MAC protocol that will contend for access to the medium when a burst of packets occurs. Large packets with low QoS values are analyzed in step 264. Bursty packets are assigned to the CSMA MAC in step 266 and frequent, regular interval packets are assigned in step 276 to a MAC that obtains a dedicated TDMA time slot, so that the packets are transmitted at regular intervals each time the time slot occurs. It should be noted that inter-arrival analysis may require that packets accumulate for a period of time or that historical data be maintained.

Similarly, packets with high QoS values are differentiated at step 270 between large and small packets. The inter-arrival times for the small packets are analyzed at step 272 and bursty packets are assigned to the TDMA reservation timeslot MAC in step 274, and frequently arriving packets are assigned to the TDMA time slot MAC in step 276. Large packets with high QoS are analyzed in step 280, and frequent packets are assigned to the TDMA time slot MAC in step 276, while bursty packets are assigned to the CSMA MAC in step 282. As can be appreciated by one skilled in the art, other protocols may be utilized and other schemes may be utilized without departing from the teachings of the invention.

As can be appreciated from the above, the present invention improves overall network performance by selecting a media access technique, for example, a MAC protocol, that obtains a higher level of efficiency for the characteristics of the packets to be transmitted. The present invention also permits a transmission node to request obtain transmission resources, such as bandwidth or time slots, based on the amount of data to be transmitted.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for selecting a medium access technique for transmission of at least one packet by a node in a communication network, the method comprising:
   determining, by the node operating within the communication network, a characteristic of the at least one packet to be transmitted by the node;
   when the characteristic is determined to be a first condition, determining, by the node, a size of the at least one packet, and based on the size of the at least one packet, determining which of a plurality of medium access technique to use by the node for transmission of the at least one packet;
   when the characteristic is determined to be a second condition, determining, by the node, a size of the at least one packet, and based on the size of the at least one packet, determining which of the plurality of medium access technique to use by the node for transmission of the at least one packet;
   when the characteristic is determined to be the first condition and the size of the at least one packet is at or above a certain size, determining, by the node, which of a first medium access technique or a second medium access technique to use by the node for transmission of the at least one packet based on another characteristic of the at least one packet; and
   when the characteristic is determined to be the first condition and the size of the at least one packet is below the certain size, determining, by the node, which of the first medium access technique or a third medium access technique to use by the node for transmission of the at least one packet based on the another characteristic of the at least one packet, wherein the another characteristic is an inter-arrival time of the at least one packet.

2. A method as claimed in claim 1, further comprising:
   transmitting, by the node, the at least one packet using the determined medium access technique.

3. A method as claimed in claim 1, further comprising:
   providing to the node the plurality of medium access techniques for transmitting a plurality of packets from the node to one or other nodes in the communication network.

4. A method as claimed in claim 1, wherein the plurality of medium access techniques include a carrier sense multiple access (CSMA) medium access control (MAC) protocol and a time division multiple access (TDMA) technique.

5. A method as claimed in claim 1, wherein:
   the characteristic is a quality of service (QoS) level, the first condition is a QoS below a certain level and the second condition is a QoS at or above the certain level.

6. A method as claimed in claim 1, wherein:
the first medium access technique is a carrier sense multiple access (CSMA) medium access control (MAC) protocol, the second medium access technique is a MAC protocol that obtains a dedicated time division multiple access (TDMA) time slot, and the third medium access technique is a MAC protocol that utilizes a TDMA channel normally used for reserving time slots.

7. A method for selecting a medium access technique for transmission of at least one packet by a node in a communication network, the method comprising:
  determining, by the node operating within the communication network, a characteristic of the at least one packet to be transmitted by the node;
  when the characteristic is determined to be a first condition, determining, by the node, a size of the at least one packet, and based on the size of the at least one packet, determining, by the node, which of a plurality of medium access technique to use by the node for transmission of the at least one packet;
  when the characteristic is determined to be a second condition, determining, by the node, a size of the at least one packet, and based on the size of the at least one packet, determining, by the node, which of the plurality of medium access technique to use by the node for transmission of the at least one packet;
  when the characteristic is determined to be the second condition and the size of the at least one packet is at or above a certain size, determining, by the node, which of a first medium access technique or a second medium access technique to use by the node for transmission of the at least one packet based on another characteristic of the at least one packet; and
  when the characteristic is determined to be the second condition and the size of the at least one packet is below the certain size, determining, by the node, which of the first medium access technique or a third medium access technique to use by the node for transmission of the at least one packet based on the another characteristic of the at least one packet, wherein the another characteristic is an inter-arrival time of the at least one packet.

8. A method as claimed in claim 7, wherein:
the first medium access technique is a MAC protocol that obtains a dedicated time division multiple access (TDMA) time slot, the second medium access technique is a carrier sense multiple access (CSMA) medium access control (MAC) protocol, and the third medium access technique is a MAC protocol that utilizes a TDMA channel normally used for reserving time slots.

9. A transmission method for a network, the method comprising the steps of:
  providing multiple medium access techniques for transmitting at least one packet between nodes in the network;
  identifying the packet as being of a particular class based on characteristics of the packet, wherein the characteristics of the packet includes desired quality of service, packet size, and inter-arrival time of the packet;
  detecting peak and estimating variance within the particular class;
  selecting one of the medium access techniques for the particular class;
  estimating bandwidth requirements for the particular class based on the detected peak and estimated variance within the particular class;
  reserving bandwidth resources for the particular class based on the estimated bandwidth requirements; and
  transmitting packets of the particular class using the selected medium access technique.

10. The method of claim 9, wherein reserving further comprises:
  contending for the bandwidth resources for the particular class.

* * * * *

UNITED STATES PATENT AND TRADEMARK OFFICE
CERTIFICATE OF CORRECTION

PATENT NO.        : 7,920,586 B2
APPLICATION NO.   : 11/238572
DATED             : April 5, 2011
INVENTOR(S)       : Alapuranen et al.

It is certified that error appears in the above-identified patent and that said Letters Patent is hereby corrected as shown below:

In Column 7, Line 65, delete "obtain" and insert -- or obtain --, therefor.

Signed and Sealed this
First Day of January, 2013

David J. Kappos
*Director of the United States Patent and Trademark Office*